INVENTOR
EDWARD J WROBLEWSKI

BY Joe L. Koerber

ATTORNEY

May 21, 1957  E. J. WROBLEWSKI  2,793,035
CARD POSITION CHECKING DEVICE
Filed May 20, 1954  3 Sheets-Sheet 2
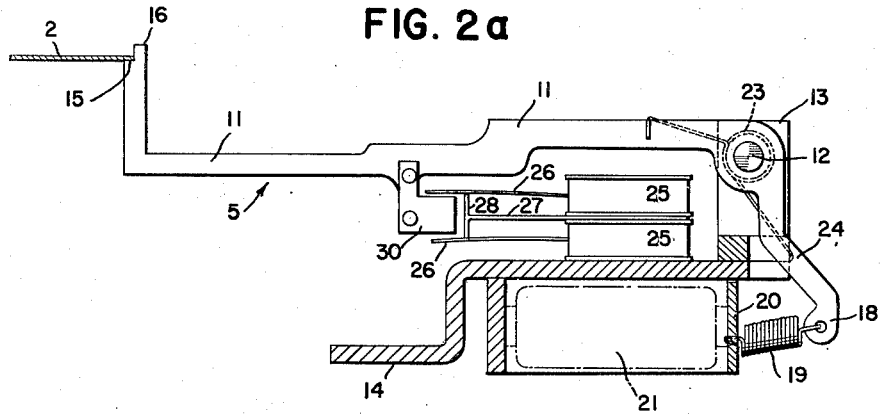
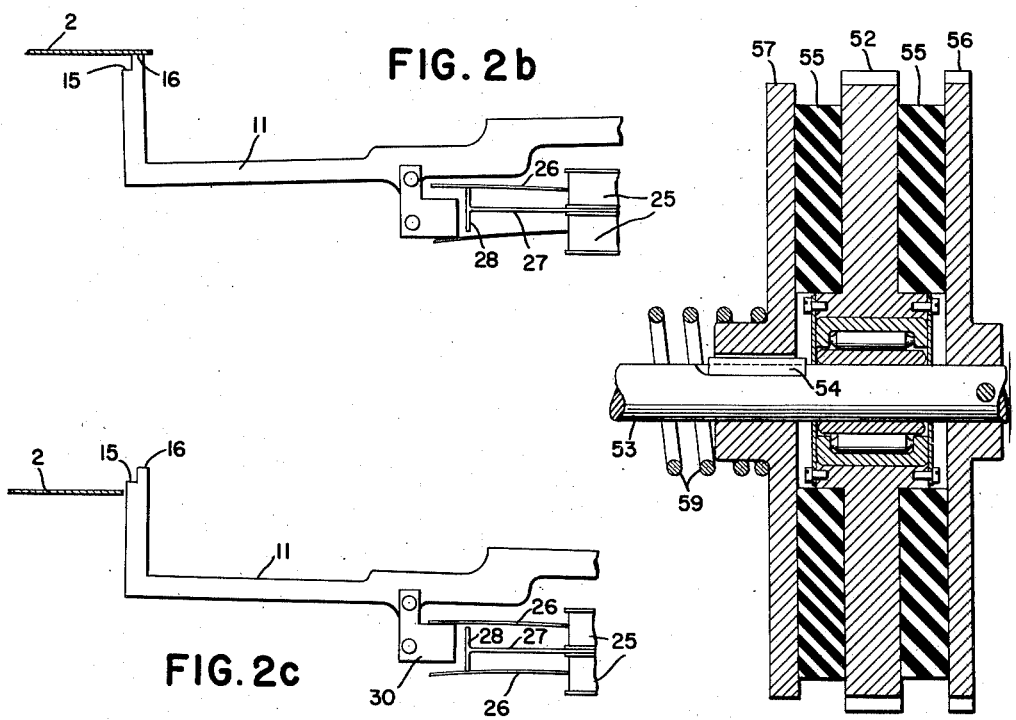
INVENTOR
EDWARD J WROBLEWSKI
BY Joe L. Koerber
ATTORNEY May 21, 1957  E. J. WROBLEWSKI  2,793,035
CARD POSITION CHECKING DEVICE
Filed May 20, 1954  3 Sheets-Sheet 3
FIG. 5
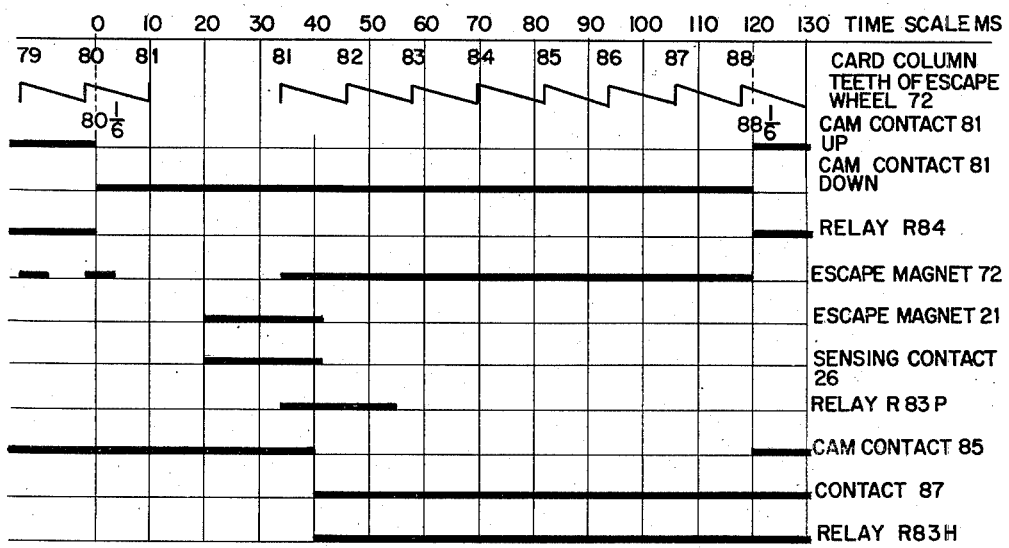
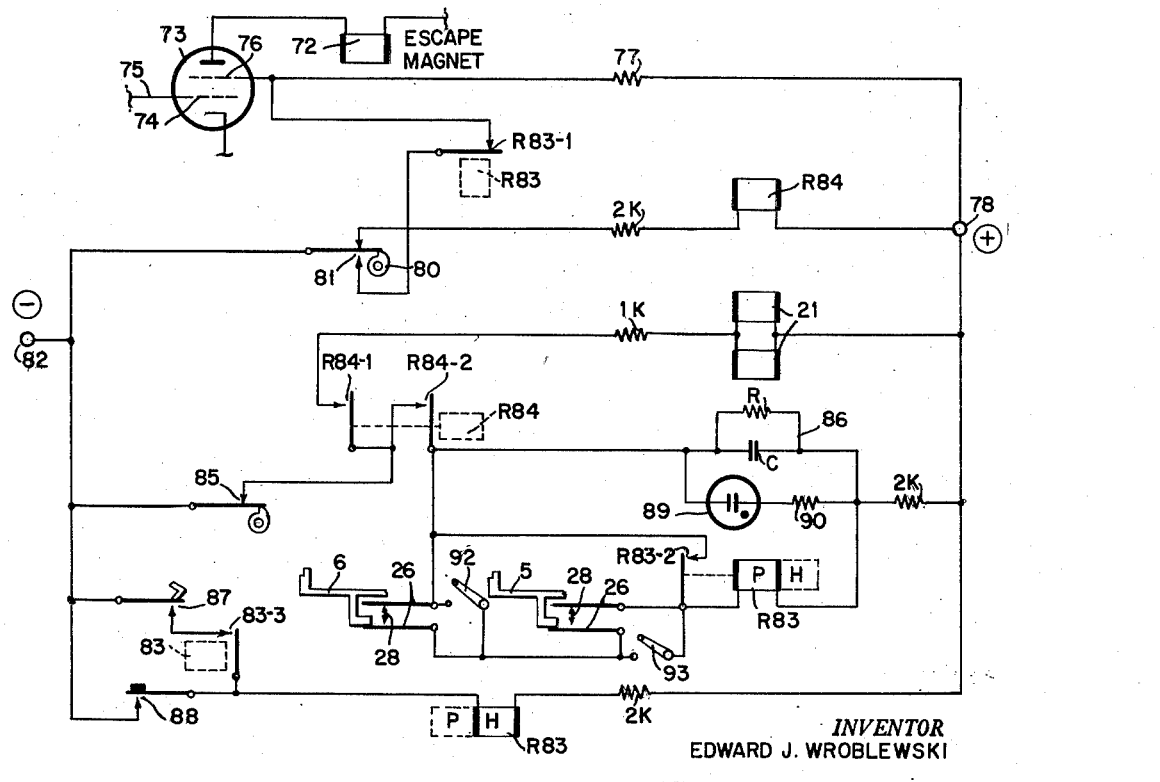
FIG. 4
INVENTOR
EDWARD J. WROBLEWSKI
BY Joe L. Koerber
ATTORNEY

United States Patent Office 2,793,035
Patented May 21, 1957

2,793,035

CARD POSITION CHECKING DEVICE

Edward J. Wroblewski, Millbrook, N. Y., assignor to International Business Machines Corporation, New York, N. Y., a corporation of New York Application May 20, 1954, Serial No. 431,175

12 Claims. (Cl. 271—57)

This invention relates to card handling machines, and more particularly to devices for checking the registration of cards at predetermined points in such machines.

Cards used in machines of the type to which this invention is directed normally have index points arranged in closely spaced rows extending transversely of the cards. Recording information on the cards may be effected by forming perforations at different index points. As a card is advanced past a row of punches which form the perforations, it must be in proper registration otherwise holes are not punched at the index points. When a card having improperly punched holes is fed past a row of sensing devices for reading the information, the holes may be sensed at the wrong time or possibly not at all.

A card could be out of registration when moving past the punches or it could be properly registered at that time but then be out of registration later when fed past the sensing devices. In either case, an error may occur in the reading of the recorded information. By providing devices which are operable automatically to check the position of cards relative to a punching line and a sensing line, it is possible to assure that the cards are properly registered both when recording information and when reading information. Such devices may be readily associated with controls for stopping the machine when a card is out of registration.

A broad object of the invention is to provide means for automatically checking the registration of each card at predetermined points in its travel through a machine.

Another object is to provide a device to accurately determine the registration of a card within very precise limits.

Still another object is to provide a device which will check for card registration and permit normal machine operation to continue if a card is properly registered at the check point.

A further object is to provide means to prevent normal operation if proper card registration is not indicated by the position checking device.

Yet another object is to provide a device to check the registration of a card and stop the machine if a card is not properly registered at the check point, whether the lack of registration is due to the card being too early or too late.

Still another object is to provide means to check the registration of two cards simultaneously and to allow normal operation only if both cards are properly registered.

Other objects of the invention will be pointed out in the following description and claims and illustrated in the accompanying drawings, which disclose, by way of example, the principle of the invention and the best mode, which has been contemplated, of applying that principle.

In the drawings:

Figs. 2a, 2b and 2c show a device in three different positions for checking three different conditions of card registration.

Fig. 3 shows in detail the frictional drive utilized to connect the drive motor and the feed roll drive of Fig. 1.

Fig. 4 is a wiring diagram of the controls for the subject device.

Fig. 5 is a timing chart to be used in conjunction with Fig. 4.

Figure 1:
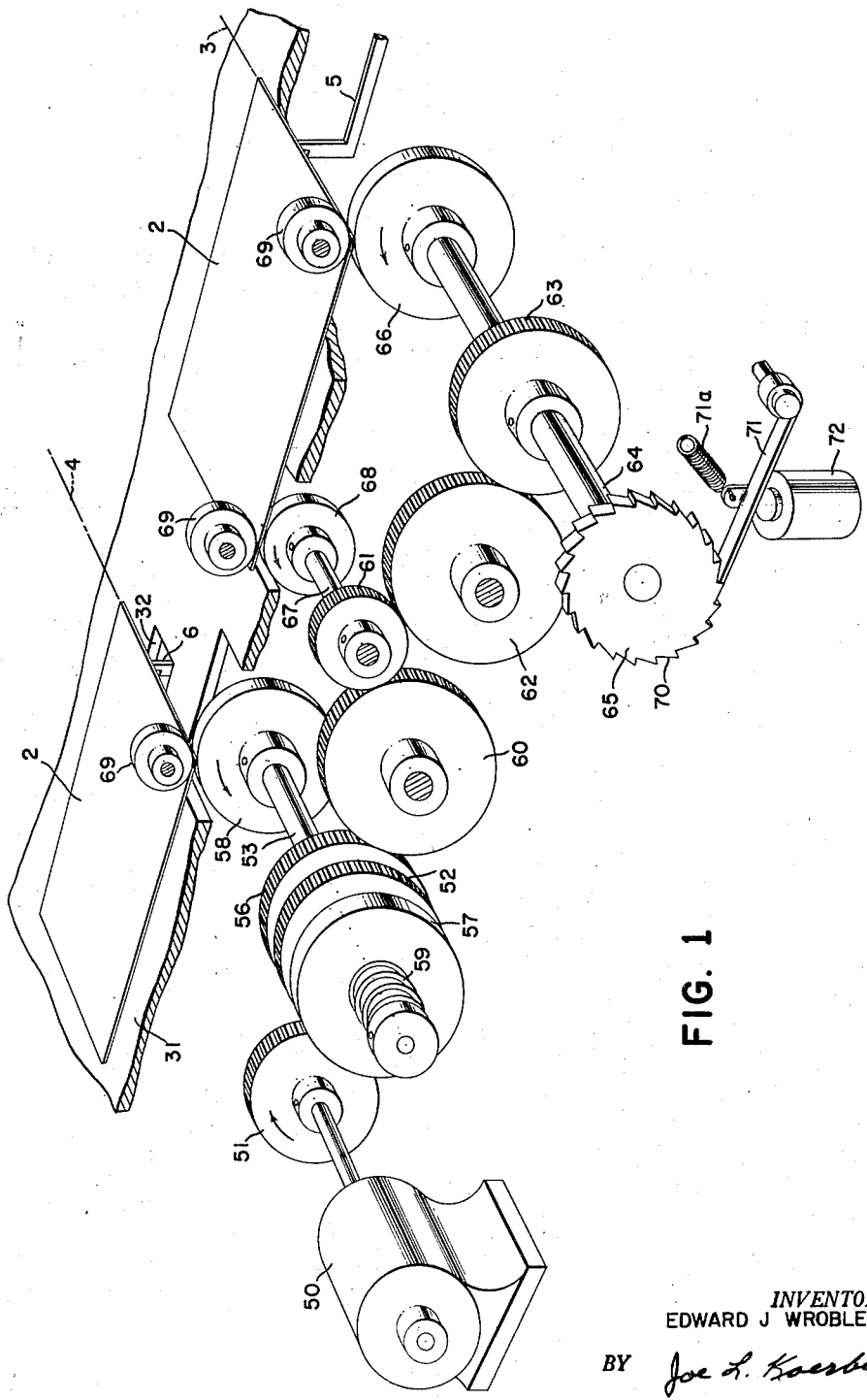
Fig. 1 is a schematic showing of the card feed rolls and the driving and controlling mechanisms therefor.

Referring to the drawings, and more particularly to Fig. 1, cards 2 are advanced serially from a hopper (not shown) to the left past a row of punch devices (not shown) arranged along a line 3 and then past a row of sensing devices (not shown) arranged along a line 4. The machine operates in a cyclical manner feeding a card from the hopper during a first cycle, registering it at the punch line 3 during the second cycle where it may be punched under manual keyboard control or automatically by duplication of data from the preceding card, advancing it to the sensing line 4 during a third cycle, and advancing it to a stacker (not shown) during a fourth cycle. The cards follow one another in such a manner that while a first card is at the sensing line 4, a second card is at the punching line 3, a third card is in a pre-registration position between the card hopper and the punch line, and a fourth card is in a position to be fed from the hopper. The cyclical feeding means and the punching and sensing devices form part of the subject matter shown and described in Letters Patent 2,647,581, issued August 4, 1953, to E. W. Gardinor et al.

This invention concerns a pair of devices 5 and 6 for checking simultaneously the registration of two cards after their last, 80th, columns of index points have passed the punching line 3 and sensing line 4, respectively.

These devices are identical in structure and therefore the description of one will suffice for both.

Referring to Fig. 2a, it will be noted that the device 5 includes a lever 11 pivotally supported by a stud 12 on a member 13 mounted on a bracket 14. The left hand end of the lever is provided with a stepped portion 15 which is adapted to engage the trailing edge of a card 2 when the latter is in registration. If the card is not in registration due to the fact that it has not been advanced far enough, then the left hand end 16 of the lever will engage the card as shown in Fig. 2b. When the card is out of registration due to over travel, then the left hand end 16 of the lever as well as the stepped portion 15 may be lifted to a position above the level of the card, as shown in Fig. 2c.

The right hand end 18 of the lever 11 is connected by a spring 19 to the armature 20 of a magnet 21 fixed to the lower side of the bracket 14. The armature 20 is pivotally supported at one end by any suitable means, not shown. When the magnet is energized, the armature is attracted to it, as shown in Fig. 2a, for placing a tension on the spring 19 and rocking the lever 11 in a clockwise direction. Due to the spring connection, the lever may be stopped in any one of the three positions indicated depending upon the position of the card whose registration is being checked.

The lever 11 is biased in a counterclockwise direction by a spring 23 mounted on the stud 12, one end of the spring 23 being retained in a groove 24 in the member 13 and the other end being hooked over the top of the lever 11 as shown.

Mounted on the top side of the bracket 14 and insulated therefrom is a unit comprising two conducting members 25 having wire contacts 26 soldered to their left ends and extending therefrom parallel to each other. Circuit connections to the contacts 26 are made through the members 25. Disposed between and insulated from these conducting members is a conducting spline 27 extending to the left between the parallel wire contacts 26 and having at its extreme left end a vertical portion 28 whose vertical dimension is somewhat greater than the spacing between the left ends of the upper and lower wire contacts 26 such that, when released, both wires 26 come in contact with the portion 28.

Attached to the lever 11 is a non-conducting lug 30 extending to the right between the ends of the wire contacts 26, the vertical dimension of this lug being somewhat less than that of the conducting portion 28 such that, when the lug is centrally positioned between the upper and lower wire contacts 26 both contacts engage the conducting portion 28.

The registration checking devices are rigidly mounted on the machine frame beneath the card bed 31, Fig. 7, by means of the brackets 14. The arrangement is such that the extreme left hand ends of the levers 11 are positioned directly below holes 32 cut in the card bed of the machine at points normally occupied by the trailing edges of cards when the 80th columns of the latter have been sensed or punched.

Proper registration of a card is indicated by the completion of a circuit between the upper and lower wire contacts 26 through the conducting portion 28 of the spline 27. Before actuation of the checking device the magnet 21 is deenergized, the lever 11 is completely below the level of the card bed, the upper wire contact 26 engages the vertical conducting portion 28, and the non-conducting lug 30 holds the lower wire contact 26 out of engagement with the portion 28. After the punching and sensing of the 80th columns of the cards have been completed and before they are allowed to escape to their next positions, the electromagnet 21 for each checking device is energized to attract its armature 20. The movement of the armature is yieldingly transmitted through the spring 19 to the lever 11 which is pivoted clockwise into the path of the cards. When the levers are actuated to move their left hand ends through holes in the card bed, one of three conditions exist with respect to each of the cards: (1) the card has advanced past the lever step 15; (2) the card is late and covers the lever tip 16; or (3) the card is properly registered with the trailing edge resting on the step 15 of the lever tip.

If the first condition (Fig. 2c) exists, the lever 11 moves through the hole until both the end 16 and the step 15 are above the plane of the card. In this position the lug 30 holds the upper wire contact 26 out of engagement with the conducting portion 28 and prevents the completion of a circuit between the wire contacts 26.

If the second condition (Fig. 2b) exists, the end 16 of the lever 11 engages the lower surface of the card and prevents the lower wire contact 26 from engaging the conducting portion 28. Again there is no circuit from one wire contact 26 to the other.

If the third condition (Fig. 2a) exists, the lever moves upwardly until the shoulder 15 engages the card. In this position the lug 30 is located midway between the wire contacts 26 and both the upper and lower wire contacts engage the conducting portion 28 thereby completing a circuit from one wire contact to the other.

It will be noted that under the first described condition the lug 30 allows the lower wire contact 26 to engage the conducting portion 28 and then it lifts the upper wire contact 26 from the conducting portion 28. For just a fleeting instant there is a circuit from the lower wire contact 26 through the conducting portion 28 to the upper wire contact. It will be explained in the circuit description why this instantaneous circuit does not cause indication of proper registration.

Referring to Fig. 1, a constantly running motor 50, drives a gear 51 meshing with a gear 52 freely mounted on a shaft 53. As shown in Fig. 3, the gear 52 is flanked on both faces by rings 55 of frictional material, one of said rings abuts a gear 56 pinned to the shaft 53 while the other abuts a disc 57, slidably affixed by a key 54 to the shaft 53, held in contact with the ring 55 by a spring 59.

Also fixed on the shaft 53 is a card feed wheel 58. There is a frictional drive from the constantly running gear 52 through the friction rings 55 tending to drive the gear 56 and the feed wheel 58.

The gear 56 operates through gears 60, 61 and 62 to drive a gear 63 pinned to a shaft 64 to which there is secured an escapement wheel 65 as well as another card feed wheel 66 similar to the card feed wheel 58. Fixed to the gear 61 is a shaft 67 carrying a feed wheel 68 located between the wheels 58 and 66. Each of the feed wheels cooperates with a pressure roller 69 to feed the cards to the left in Fig. 1. The escapement wheel 65 is provided with ratchet teeth 70 that engage with the armature 71 of an escape magnet 72. The feed wheels and the escapement wheel 65 may be driven in a counterclockwise direction through the previously described friction drive coupling but are normally constrained against such movement by engagement of the armature 71 with one of the teeth 70 on the escapement wheel 65 under bias of a spring 71a. This constitutes a means to disable the card feed.

When the armature 71 is withdrawn from engagement with the teeth of the wheel 65 by energizing the magnet 72, the friction drive referred to is effective to drive the card feed wheels for advancing the cards. The magnet 72 acting on the armature 71 constitutes a means to render ineffective the said means to disable the card feed.

*Circuit description*

The escape magnet 72, as shown in Fig. 4, is energized under the control of a tube 73. A control grid 74 in this tube is normally pulsed through a circuit connection 75, described in the above mentioned Letters Patent to Gardinor et al., for effecting a firing of the tube to energize the escape magnet and cause a step by step advancement of the cards. When the last columns of index points on the cards have been punched and sensed at their respective punching and sensing lines, the grid 74 is pulsed so as to hold the escape magnet energized for ejecting the cards.

In order to check the cards for registration, circuits have been provided, as shown in Fig. 4, for deenergizing the escape magnet as the last columns of the cards move past the punch and read lines. Included in the tube 73 is a screen grid 76 which is connected through a resistor 77 to a terminal 78 connected to a positive voltage supply. With this positive voltage applied to the screen grid, the tube 73 conducts when the control grid 74 is pulsed through the circuit connection 75. When a negative voltage is applied to the screen grid, the tube 73 cuts off.

Assuming that the cards have 80 columns of index points at which information may be punched and sensed, a negative voltage may be applied to the screen grid soon after the last or 80th columns pass the punching and sensing lines. To accomplish this, there is provided a cam 80 which is driven by any suitable means and which operates to transfer a contact 81 from the position shown in Fig. 4 when column 80 ⅛ of a card passes the punching line 3. The transfer of the contact 81 completes a circuit from a negative voltage terminal 82 through the contact 81 normally open, through a relay contact R83–1 to the screen grid 76, cutting off the tube 73 and deenergizing the escape magnet 72.

Before the cam contact 81 is transferred, a circuit is complete from the terminal 82 through the contact 81 normally closed, a 2K resistor, and a relay R84 to the terminal 78. The transferring of the contact 81 breaks the circuit through the relay R84, deenergizing the latter to effect a closing of its contacts R84–1 and R84–2. The closing of contact R84–1 completes a circuit from the negative terminal 82 through a cam contact 85, through the relay contact R84–1 through a 1K resistor and two parallel connected magnets 21 to the positive terminal 78. Upon energizing the magnets 21, the registration checking devices 5 and 6 are actuated to sense the positions of the cards.

The closing of the relay contact R84-2 completes a circuit from the negative terminal 82 through a cam contact 85 through the relay contact R84-2, through an RC circuit 86 consisting of a rsistor R and a condenser C connected in parallel, and through a 2K resistor to the terminal 78. Another circuit is completed at the same time if the cards were in registration and permitted the wire contacts 26 to engage the spline portions 28 of the registration checking devices. This circuit extends from the negative terminal 82 through the cam contact 85, through the relay contact R84-2, through the wire contacts 26 of the devices 5 and 6 in series, through the pickup winding P of a relay R83, and through the 2K resistor to the terminal 78.

The timing chart of Fig. 5 is shown with zero time at the point where the cam contact 81 transfers. The escapement action going on at that time is completed ten milliseconds later. The relay R84 is deenergized upon the transfer of the cam contact 81 and its contact R84-1 is closed immediately to energize the magnets 21. The devices 5 and 6 are actuated by the magnets 21 within twenty milliseconds and complete circuits through the wire contacts 26 and the pick-up winding of the relay R83 if the cards are in registration. The relay R83, however, is delayed for about fourteen milliseconds in picking up due to the RC circuit mentioned above. This delay allows sufficeint time for the devices 5 and 6 to reopen the wire contacts 26 if there is non-registration due to overtravel of the cards. As soon as the relay R83 picks up, its contact R83-1 opens to remove the negative potential from the screen grid of the tube 73 so that the latter may conduct and energize the escape magnet 72.

Connected around the wire contacts 26 of the two checking devices is a circuit including a relay contact R83-2 which is normally open. This circuit is closed when the relay R83 picks up and is held closed until after the checking devices have opened their wire contacts, thereby preventing arcing at the contacts.

A card operated contact 87 is positioned to be closed by a card in the check position. When the relay R83 picks up, the relay point 83-3 closes and establishes a circuit from the terminal 82, through the contact 87, the relay point 83-2, a hold coil of the relay R83, a 2K resistor to the terminal 78. When card escapement begins, the contact 85 opens to deenergize the magnets 21 and the pick coil of the relay R83. As the leading edge of the card 2 arrives at the sensing line, 4, the contact 87 opens dropping the relay R83 and at the same time the contact 81 transfers.

If either or both of the cards are out of registrtaion, the circuit through tthe wire contacts 26 and the pick up coil of relay R83 is not established and escapement does not take place. Proper action may be taken by the operator. Escapement may be initiated manually by depression of a key 88 to establish a circuit from the post 82 through the key 88 and the relay winding R83H to the post 78. Energizing of this relay winding opens the contact R83-1 and, as described, allows escapement.

Connected in parallel with the R-C unit 86 is a series circuit consisting of a neon bulb 89 and a resistor 90. When one or both of the cards are out of registration and no circuit is established through the series contacts 26, the neon bulb 89 is lighted when the condenser C becomes charged to a suitable potential, thereby indicating an error.

It may sometimes be desirable to check the registration of cards at only one point. For instance, the machine may be operated to punch cards but the sensing of these cards at the reading station is dispensed with. In this case, it is only necessary to check the cards for registration at the punching station. The checking device 6 at the sensing station may be made ineffective by closing a switch 92 to complete a circuit which by-passes the wire contacts 26 at this checking device. In the same way, the device 5 at the punching station may be made ineffective by closing a switch 93 to complete a circuit by-passing its wire contacts 26.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A card handling machine comprising, in combination, means for feeding cards in a predetermined path, means for disabling said feeding means at a predetermined time during the feeding of each card, a device for detecting the position of each card while said feeding means are disabled, and means controlled by said device and operating to render said disabling means ineffective if the card is located in a predetermined position.

2. A card handling machine comprising, in combination, means for feeding cards in a predetermined path, means for disabling said feeding means at a predetermined time during the feeding of each card, a device for detecting the position of each card while said feeding means are disabled, said device having different portions engageable with an edge of the card and assuming different positions depending upon which of its portions engages the card, and means controlled by said device and operating to render said disabling means ineffective only when a certain one of said portions engages said card.

3. The mechanism of claim 2 in which said device comprises a lever having a stepped portion and an end portion, said lever being operable to engage the card with its end portion or with said stepped portion depending upon the position of the card, and said means controlled by said device operates to render said disabling means ineffective when said stepped portion engages said card.

4. A card handling machine comprising, in combination, means for feeding cards in a given path, means for disabling said feeding means at a predetermined time in the feeding of each card, a device for detecting the position of each card while said feeding means are disabled, said device being movable to different positions depending on whether said card is in a correct position, a position too advanced, or a position too retarded, and means controlled by said device and operating to render said disabling means ineffective only when said device assumes the position taken when the card is in its correct position.

5. A record handling machine comprising, in combination, cyclical means for advancing records in a predetermined path past an index line, means for disabling said advancing means at a predetermined instant in each cycle, means for detecting the position of a predetermined edge of a record with respect to said index line while said advancing means are disabled, means operable by said detecting means for rendering said disabling means ineffective when said edge of said record is aligned with said index line.

6. The machine of claim 5, in which said last mentioned means is operable for rendering said disabling means ineffective when said edge of the record is within a predetermined allowable range of deviation from said index line.

7. A card handling machine comprising, in combination, cyclical means for advancing record cards in a predetermined path past an index line, means for disabling said advancing means at a predetermined instant in each cycle, a device operatively connected to said machine for automatic actuation at said instant for detecting whether a predetermined edge of a stopped card is aligned with said index line, and means responsive to the detection of an aligned card for rendering said disabling means ineffective.

8. A card handling machine comprising, in combination, cyclical means for advancing record cards in a predetermined path past an index line, means for disabling said advancing means at a predetermined instant in each cycle, an electro-mechanical device operatively connected to said machine for automatic actuation at said instant for detecting whether a predetermined edge of a card is aligned with said index line, and means responsive to the detection of said edge within a predetermined allowable range of deviation from said index line for completing an electric circuit to render said disabling means ineffective.

9. The invention set forth in claim 8 in which said device includes a card sensing lever having a stepped portion, and said last mentioned means is operative to complete said circuit when said stepped portion of said lever engages said card.

10. A card handling machine comprising, in combination, cyclical means for advancing cards in a predetermined path past a first index line and a second index line, means operable at a predetermined instant in each cycle for disabling said advancing means whereby one of said cards is stopped adjacent said first index line and another of said cards is stopped adjacent said second index line, electrically actuated, mechanical devices including notched card sensing levers positioned at each of said index lines for detecting whether predetermined edges of said stopped cards are aligned with their respective index lines, and means operable upon the detection of an edge of each card within a predetermined allowable range of deviation from its index line for rendering said disabling means ineffective.

11. A card handling machine comprising, in combination, electronically controlled cyclically operating escapement means for advancing record cards serially in a predetermined path past an index line, means for disabling said advancing means at a predetermined instant in each cycle, an electrically actuated mechanical device operatively connected to said machine for automatic actuation at said instant for detecting whether a predetermined edge of a card is aligned within a predetermined allowable range of deviation from said index line, and circuit means operable when said device detects said card edge within said predetermined allowable range for rendering said disabling means ineffective.

12. A card handling machine comprising, in combination, cyclical means for advancing cards in a predetermined path past a first index line and a second index line, means operable at a predetermined instant in each cycle for disabling said advancing means whereby one of said cards is stopped adjacent said first index line and another of said cards is stopped adjacent a second index line, electrically actuated, mechanical devices including notched card sensing levers positioned at each of said index lines for sensing the positions of said cards with respect to said index lines, each of said notched card sensing levers assuming one of three positions depending upon whether the respective card is advanced, correctly positioned or retarded, circuit means operable by each of said sensing means when said cards are found to be aligned with respective index lines, means serially connecting said circuit means, and means operable upon the completion of said serially connected circuits for rendering said disabling means ineffective.

References Cited in the file of this patent
UNITED STATES PATENTS

| 625,094 | Dexter | May 16, 1899 |
| 1,991,729 | Broughan | Feb. 19, 1935 |